Patented Aug. 12, 1924.

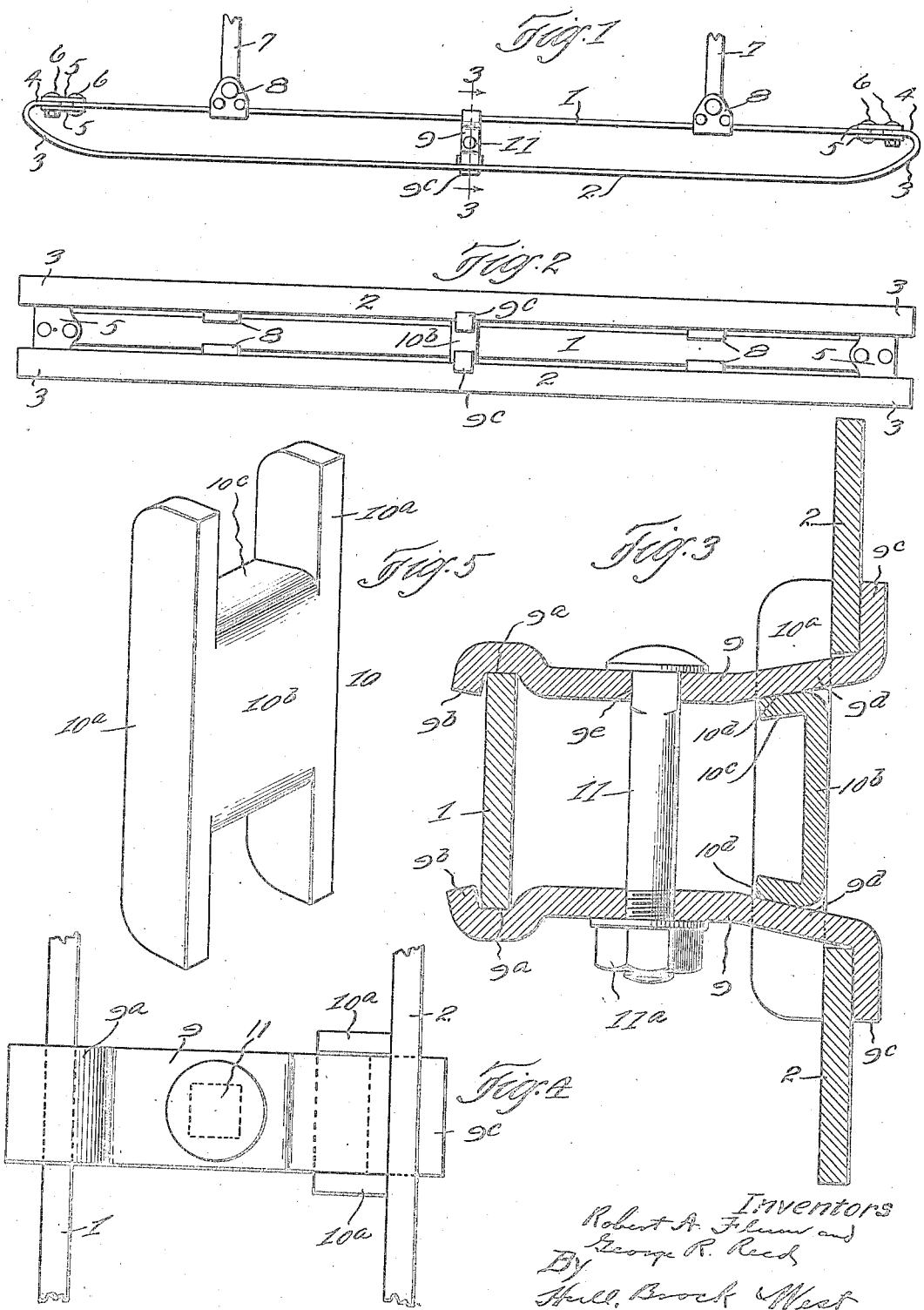

1,504,947

UNITED STATES PATENT OFFICE.

ROBERT A. FLUM AND GEORGE R. REED, OF KALAMAZOO, MICHIGAN, ASSIGNORS TO THE C. G. SPRING & BUMPER COMPANY, OF DETROIT, MICHIGAN, A CORPORATION OF DELAWARE.

CLAMP FOR BUMPER BARS.

Application filed October 20, 1923. Serial No. 669,659.

*To all whom it may concern:*

Be it known that we, ROBERT A. FLUM and GEORGE R. REED, citizens of the United States, residing at Kalamazoo, in the county of Kalamazoo and State of Michigan, have invented a certain new and useful Improvement in Clamps for Bumper Bars, of which the following is a full, clear, and exact description, reference being had to the accompanying drawings.

This invention relates to bumpers for automobiles or similar vehicles, and more particularly to bumpers of the type wherein the central portion of the rear or auxiliary bar is connected to the central portions of a plurality of vertically spaced front or impact bars. It is the general purpose and object of the invention to provide means for clamping together the central portions of such bars in a particularly effective manner; also to accomplish this result in and through a construction of clamping device which is extremely simple in construction and economical of production, and which can be conveniently applied to and removed from the bars with which it is associated.

We accomplish the foregoing objects, and other and more limited objects which will appear hereinafter, in and through the construction and arrangement of parts shown in the drawings forming part hereof, wherein Fig. 1 represents a plan view of a bumper, of the type referred to, having our invention applied thereto; Fig. 2 a front elevation of such bumper; Fig. 3 an enlarged sectional detail corresponding to the line 3—3 of Fig. 1; Fig. 4 an enlarged detail in plan of the parts shown in Fig. 3; and Fig. 5 a detail in perspective of one of the parts of the clamping device.

Describing the various parts by reference characters, 1 denotes the rear or auxiliary bar and 2 the vertically spaced, parallel front or impact bars of a bumper. The ends of the bars 2 are bent rearwardly and then inwardly, as shown at 3 and 4, and the ends 4 are connected to the outer ends of the bar 1 by means of clamping plates 5 and bolts or rivets 6. The rear or auxiliary bar 1 is shown as supported from arms 7 by means of clamps 8, the arms 7 in turn being connected at their rear or inner ends with the side members of the vehicle (not shown).

For the purpose of stiffening the central portion of the bumper, the central portion of the bar 1 is connected to the central portions of the bars 2 by a combined clamping and spacing device. This device consists generally of a pair of symmetrical clamping plates, each adapted to engage an edge of the rear or auxiliary bar and the adjacent edge and front or outer face of the impact bar adjacent thereto, a bolt intermediate the ends of the said clamping plates and serving to clamp the same upon the rear or auxiliary bar, and a spacing and clamping device including a wedge plate adapted to be inserted between the clamping plates and having at its ends projections adapted to engage the rear or inner faces of the front or impact bars.

9 denotes generally the upper and lower clamping plates, which are preferably symmetrical and interchangeable, each plate having at its rear or inner end a transversely extending seat $9^a$, the said seats being adapted to engage the upper and lower edges of the rear or auxiliary bar 1, the rear or inner ends of the clamping plates being approximately U-shaped in section to provide such seats, the extreme rear or inner ends $9^b$ of the plates being projected toward each other, when the plates are assembled. The front end of each plate 9 is bent at nearly right angles from the adjacent body portion, as shown at $9^c$, in order to provide a flange or projection which is adapted to engage the front faces of the upper and lower bars 2. The clamping plates are so shaped that, when assembled, the front or outer portions of the plates diverge from each other, providing therebetween inwardly or rearwardly convergent tapering surfaces for the reception of the correspondingly tapered or beveled upper and lower surfaces of the spacing portions of the clamping and spacing block or member. This block or member is indicated generally at 10, and comprises a pair of vertical projections or bars $10^a$ connected at their central portions by a transverse plate $10^b$, the said plate having top and bottom flanges $10^c$, the upper and lower surfaces of such flanges being beveled and converging rearwardly so as to engage the correspondingly beveled or flared portions $9^d$ of the clamping plates.

Each plate 9 is provided with an aperture $9^e$, intermediate the ends thereof, the apertures being adapted to receive a bolt 11.

With the parts constructed and arranged as described, the plates 9 will be applied to the bumper with their front or outer flanges 9ᶜ engaging the front or outer faces of the bars 2. The cooperating spacing and clamping member 10 will then be applied in place, with the front edges of the projections or bars 10ᵃ thereof in engagement with the rear faces of the respective bars 2, directly opposite the flanges 9ᶜ, and with the intermediate portion 10ᵇ interposed between the parts 9ᵈ. The bolt 11 is then inserted and the nut 11ᵃ is set up. This will draw the seats 9ᵃ into close engagement with the upper and lower edges of the rear or auxiliary bar and will tend to force the combined clamping and spacing block 10 forwardly or outwardly, due to the inclined surfaces 9ᵈ and 10ᵈ. This outward movement of the clamping and spacing block causes the front or outer faces of the bars or projections 10ᵃ to press firmly against the rear or inner faces of the bars 2, thereby holding the said bars firmly in the seat formed between the flanges 9ᵉ and the said bars or projections 10ᵃ.

The clamping device comprising the parts 9 and 10 can be made from stamped metal and is comparatively cheap of production. As will be evident from the construction and operation of the same, it is extremely efficient in operation and is capable of being quickly and conveniently applied to and removed from its cooperative relation with respect to the bars 1 and 2.

For convenience of description, we have assumed that the bumper shown herein is applied to the front of an automobile, and the terms "front" and "rear" have been applied accordingly. By the use of such language, however, we do not propose to limit the use of our invention to any particular location of bumper or to any particular relation of the parts thereof. Furthermore, we do not propose to limit ourselves to a bumper wherein the vertically spaced bars 2 constitute the impact section and the bar 1 the rear or auxiliary section, as this arrangement might be reversed without affecting the scope of our invention.

Having thus described our invention, what we claim is:—

1. In a bumper, the combination, with a pair of front vertically spaced bars, of a bar spaced rearwardly from the first mentioned bars, a clamping device for connecting the last mentioned bar with the two first-mentioned bars, the said clamping device comprising a pair of opposed clamping plates each having at one end a seat for an edge of the third bar and each having at its opposite end a flanged portion adapted to engage the front face of one of the first two bars, respectively, each of said plates having a tapered surface, the said surfaces constituting a rearwardly convergent seat therebetween, clamping members adapted to cooperate with the rear or inner faces of the first two plates, the said members being connected by an intermediate portion having tapered surfaces engaging the convergent seat formed between the said plates, and means located between the said intermediate portion and the seats at the rear or inner ends of the clamping plates, for adjusting the said plates toward each other.

2. In a bumper, the combination, with a pair of vertically spaced front or impact bars, of a rear or auxiliary bar having a portion spaced from the first mentioned bars and located intermediate the top of the upper bar and the bottom of the lower bar, a clamping device for connecting the third bar with the two first-mentioned bars, the said clamping device comprising an upper and a lower clamping plate each having at its rear end a seat for an edge of the third bar and at its front end a projection adapted to engage the lower portion of the front face of the upper bar and the upper portion of the front face of the lower bar, respectively, each of said plates having a tapered surface located rearwardly of its flange or projection, the said tapered surfaces converging rearwardly, a clamping and spacing member for the rear faces of the first mentioned bars, the said member comprising an intermediate portion having an upper and a lower tapered surface adapted to cooperate with the tapered surfaces of the said clamping plates, there being projections extending from each end of such intermediate portion and adapted to engage the lower rear face and the upper rear face of the two first mentioned bars, respectively, and means interposed between the said device and the seats at the rear ends of said clamping plates for drawing the said plates together.

3. In a bumper, the combination, with a pair of vertically spaced front or impact bars, of a rear or auxiliary bar having a portion spaced from the first mentioned bars and located intermediate the top of the upper bar and the bottom of the lower bar, a clamping device for connecting the spaced portion of the third bar with the two first mentioned bars, the said clamping device comprising an upper and a lower clamping plate, each having at its rear end a seat for an edge of the third bar and at its front end a projection adapted to engage the lower portion of the front face of the upper bar and the upper portion of the front face of the lower bar, respectively, means located intermediate the seats and the projections thereof for drawing the said plates together, and a combined spacing and clamping member having a portion adapted to be inserted between the said plates in front of such connecting means, the said member having projections adapted to engage the rear faces of the two first mentioned bars, the interposed portion of such member and the said plates having engaging surfaces adapted and arranged to cause a forward movement of said member by the adjustment of the said connecting means.

4. In a bumper, the combination, with a pair of vertically spaced front or impact bars, of a rear or auxiliary bar having a portion spaced from the first mentioned bars and located intermediate the top of the upper bar and the bottom of the lower bar, a clamping device for connecting the spaced portion of the third bar with the two first mentioned bars, the said clamping device comprising an upper and a lower clamping plate, each having at its rear end a seat for an edge of the third bar and at its front end a projection adapted to engage the lower portion of the front face of the upper bar and the upper portion of the front face of the lower bar, respectively, a spacing member interposed between the said connecting means and the projections on said plates, the said member itself having projections adapted to engage the rear surfaces of the two first mentioned bars, and means located intermediate the seats and the projections of said plates for drawing the latter together, the said plates having surfaces cooperating, by the adjustment of such connecting means, to move the said member forwardly, thereby to press the projections thereof into engagement with the two first-mentioned bars.

5. In a bumper, the combination, with a pair of vertically spaced front or impact bars, of a rear or auxiliary bar having a portion spaced from the first mentioned bars and located intermediate the top of the upper bar and the bottom of the lower bar, a clamping device for connecting the bar, a clamping device for connecting the spaced portion of the third bar with the two first mentioned bars, the said clamping device comprising an upper and a lower clamping plate, each having at its rear end a seat for an edge of the third bar and at its front end a projection adapted to engage the lower portion of the front face of the upper bar and the upper portion of the front face of the lower bar, respectively, means located intermediate the seats and the projections thereof, for drawing the said plates together, and a combined spacing and clamping member having an intermediate portion adapted to be inserted between the said plates in front of such connecting means, the said member having projections at each end thereof adapted to receive the said plates therebetween and to engage the rear faces of the two first mentioned bars, the interposed portion of such member and the said plates having engaging surfaces adapted and arranged to cause a forward movement of said member by the adjustment of the said connecting means.

In testimony whereof, we hereunto affix our signatures.

R. A. FLUM.
GEO. R. REED.